US011334452B1

(12) United States Patent
Vaughn et al.

(10) Patent No.: US 11,334,452 B1
(45) Date of Patent: May 17, 2022

(54) PERFORMING REMOTE PART RESEAT ACTIONS (71) Applicant: International Business Machines Corporation, Armonk, NY (US)

(72) Inventors: Kelly Vaughn, Hillsborough, NJ (US); Michael Kane, Poughkeepsie, NY (US); Dane Warren, Highland, NY (US); Thomas Mathias, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/341,530

(22) Filed: Jun. 8, 2021

(51) Int. Cl.
*G06F 11/18* (2006.01)
*G06F 11/16* (2006.01)
*G06F 11/07* (2006.01)

(52) U.S. Cl.
CPC ........ *G06F 11/182* (2013.01); *G06F 11/0778* (2013.01); *G06F 11/0784* (2013.01); *G06F 11/165* (2013.01); *G06F 11/1641* (2013.01)

(58) Field of Classification Search
CPC ............... G06F 11/182; G06F 11/0778; G06F 11/0784; G06F 11/1641; G06F 11/165
See application file for complete search history.

(56) References Cited

U.S. PATENT DOCUMENTS

| 5,815,652 | A | * | 9/1998 | Ote | G06F 11/3055 |
| | | | | | 709/224 |
| 6,434,712 | B1 | * | 8/2002 | Urban | G06F 11/181 |
| | | | | | 714/10 |
| 9,483,594 | B2 | | 11/2016 | Kwok | |
| 9,485,655 | B1 | | 11/2016 | Pirrotta | |
| 10,223,188 | B2 | | 3/2019 | Agnihotram | |
| 10,436,179 | B2 | | 10/2019 | Noto | |
| 10,846,160 | B2 | * | 11/2020 | Chou | G06F 11/3409 |
| 10,969,431 | B1 | * | 4/2021 | Dorrance | G06F 30/32 |
| 2004/0039959 | A1 | * | 2/2004 | LeCrone | G06F 11/2094 |
| | | | | | 714/E11.13 |
| 2005/0283672 | A1 | * | 12/2005 | Brown | G06F 11/0778 |
| | | | | | 714/31 |
| 2014/0201578 | A1 | * | 7/2014 | Kosut | G06F 11/0736 |
| | | | | | 714/55 |
| 2015/0205676 | A1 | * | 7/2015 | Zheng | G06F 9/4406 |
| | | | | | 714/15 |
| 2018/0095847 | A1 | | 4/2018 | Patil | |
| 2020/0133759 | A1 | * | 4/2020 | Arzola | G06F 11/0745 |

FOREIGN PATENT DOCUMENTS

| CN | 104243177 A | 12/2014 |
| CN | 110177751 A | 8/2019 |

* cited by examiner

*Primary Examiner* — Matthew M Kim
*Assistant Examiner* — Indranil Chowdhury
(74) *Attorney, Agent, or Firm* — William H. Hartwell; Aaron N. Pontikos (57) ABSTRACT

A tool for performing remote part reseat actions. Responsive to receiving a request for a scheduled operation, the tool generates an operation table in a push file. Responsive to a determination that there is at least one redundant component for the scheduled operation, the tool identifies the at least one redundant component. The tool determines one or more tolerable errors for the at least one redundant component. The tool appends the at least one redundant component and the one or more tolerable errors to the operation table in the push file. The tool schedules the push file to prescribe one or more recovery operations for the scheduled operation.

17 Claims, 8 Drawing Sheets

PERFORMING REMOTE PART RESEAT ACTIONS

BACKGROUND OF THE INVENTION

The present invention relates generally to information technology operations, and more particularly to remote recovery operations.

Information Technology (IT) Operations management is critical for most companies that rely on IT systems for mission-critical business applications. Despite the best intentions of engineers, outages do occur, resulting in millions of dollars of losses in labor, revenue, and customer satisfaction each year.

Diagnosing and remediating component faults on systems installed or residing at a client site often require a technician to be on-site to execute reseat actions for a malfunctioning component.

Dispatching a technician for on-site remediation for a basic step in a problem determination and recovery process can lead to extended recovery times, increased cost, and difficulties in scenarios where site access may be restricted.

SUMMARY

Aspects of an embodiment of the present invention disclose a method, computer program product, and computer system for performing remote part reseat actions. Responsive to receiving a request for a scheduled operation, the method includes generating, by one or more computer processors, an operation table in a push file. Responsive to a determination that there is at least one redundant component for the scheduled operation, the method includes identifying, by the one or more computer processors, the at least one redundant component. The method includes determining, by the one or more computer processors, one or more tolerable errors for the at least one redundant component. The method includes appending, by the one or more computer processors, the at least one redundant component and the one or more tolerable errors to the operation table in the push file. The method includes scheduling, by the one or more computer processors, the push file to prescribe one or more recovery operations for the scheduled operation.

DETAILED DESCRIPTION

Embodiments of the present invention recognize that dispatching a technician for on-site remediation for a basic step in a problem determination and recovery process can lead to extended recovery times, increased cost, and difficulties in scenarios where site access may be restricted. Embodiments of the present invention recognize that reseat actions do not need to involve physically unplugging or re-plugging hardware, but instead may include software operations that drive software resets and software redefinitions that occur during a physical reseat operation.

Embodiments of the present invention provide a method to safely and reliably perform reseat actions to improve recovery times, reduce labor costs for remote diagnostic and recovery capabilities, and improve quality of service to clients. Embodiments of the present invention provide the capability to perform reseat actions, where the reseat actions include performing remote software actions, such as software resets and software redefinitions, that would typically occur on-site when a part is physically reseated. Embodiments of the present invention provide the capability for communicating and storing data and instructions for remote recovery operations. Embodiments of the present invention further provide the capability to reconcile client recovery windows, client authorized recovery methods, prescriptive recovery procedures, and states of critical components. Embodiments of the present invention provide the capability to perform redundancy checks based on instructions and data provided by support personnel prior to performing a remote reseat operation. Embodiments of the present invention provide the capability to perform detailed prerequisite checks and utilize scheduled operation push files to prescribe detailed recovery operations. Embodiments of the present invention provide a structure for communicating and storing data and instructions for remote recovery operations. Embodiments of the present invention provide the capability to perform redundancy checks based on instructions and data provided by support personnel prior to executing a remote reseat operation.

Implementation of such embodiments may take a variety of forms, and exemplary implementation details are discussed subsequently with reference to the Figures.

Figure 1:
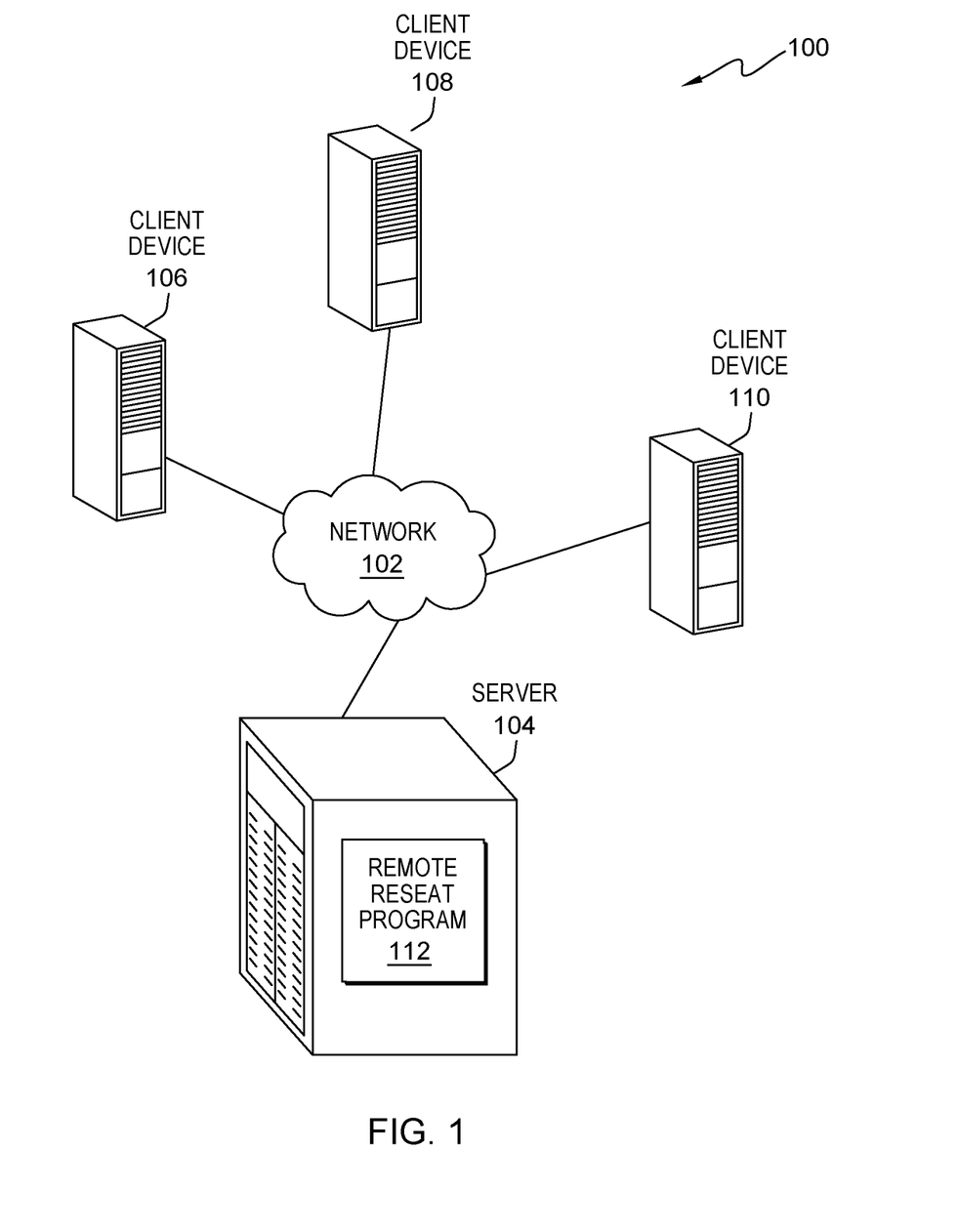
FIG. 1 illustrates a data processing environment, generally designated 100, in accordance with an embodiment of the present invention.

Referring now to various embodiments of the invention in more detail, FIG. 1 is a functional block diagram that illustrates a data processing environment, generally designated 100, suitable for performing remote part reseat actions, in accordance with at least one embodiment of the invention. The present invention will now be described in detail with reference to the Figures. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. FIG. 1 includes network 102, server 104, one or more client devices, such as client device 106, client device 108, and client device 110, and remote reseat program 112.

In one embodiment, network 102 is the Internet representing a worldwide collection of networks and gateways that use TCP/IP protocols to communicate with one another. Network 102 may include wire cables, wireless communication links, fiber optic cables, routers, switches and/or firewalls. Server 104, client device 106, client device 108, and client device 110 are interconnected by network 102. Network 102 can be any combination of connections and protocols capable of supporting communications between server 104, client device 106, client device 108, client device 110, and remote reseat program 112. Network 102 can be, for example, a telecommunications network, a local area network (LAN), a virtual local area network (VLAN), a wide area network (WAN), such as the Internet, or a combination of the three, and can include wired, wireless, or fiber optic connections. Network 102 may include one or more wired and/or wireless networks that are capable of receiving and transmitting data, voice, and/or video signals, including multimedia signals that include voice, data, and video information. In general, network 102 may be any combination of connections and protocols that will support communications between server 104, client device 106, client device 108, client device 110, and remote reseat program 112, as well as other computing devices (not shown) within data processing environment 100. FIG. 1 is intended as an example and not as an architectural limitation for the different embodiments.

In one embodiment, server 104 may be, for example, a server computer system such as a management server, a web server, or any other electronic device or computing system capable of sending and receiving data. In another embodiment, server 104 may be a data center, consisting of a collection of networks and servers providing an IT service, such as virtual servers and applications deployed on virtual servers, to an external party. In another embodiment, server 104 represents a "cloud" of computers interconnected by one or more networks, where server 104 is a computing system utilizing clustered computers and components to act as a single pool of seamless resources when accessed through network 102. This configuration may be implemented for data centers in addition to cloud computing applications. In one embodiment, server 104 includes remote reseat program 112 for performing remote part reseat operations.

In one embodiment, remote reseat program 112 operates on a central server, such as server 104, and can be utilized by one or more client devices, such as client device 106, client device 108, and client device 110, via an application download from the central server or a third-party application store and executed on the one or more client devices. In another embodiment, remote reseat program 112 may be software, downloaded from a central server, such as server 104, and installed on one or more client devices, such as client device 106, client device 108, and client device 110. In yet another embodiment, remote reseat program 112 may be utilized as a software service provided by a third-party cloud service provider (not shown). In yet another embodiment, remote reseat program 112 may include one or more components (not shown), such as add-ons, plug-ins, and agent programs, etc., installed on one or more client devices, such as client device 106, client device 108, and client device 110, for performing remote part reseat actions. In one embodiment, remote reseat program 112 can be an add-on feature to a third-party that provides a user, such as an IT service technician or engineer, the ability to perform remote part reseat operations. In one embodiment, remote reseat program 112 can be fully integrated with a third-party IT management service. In some embodiments, remote reseat program 112 may be partially integrated or separate from an IT management service. In one embodiment, remote reseat program 112 may be an application, downloaded from an application store or third-party provider, capable of being used in conjunction with IT management tools on one or more client devices, such as client device 106, client device 108, and client device 110, to perform remote part reseat operations.

In one embodiment, remote reseat program 112 can be utilized by a client device, such as client device 106, client device 108, and client device 110, to perform remote part reseat actions. In one embodiment, remote reseat program 112 provides the capability to generate a push file for a remote support operation request to be performed at a specified time period. In one embodiment, remote reseat program 112 provides the capability to perform a prerequisite check, where the prerequisite check includes a plurality of check steps to perform prior to performing the reseat operation. In one embodiment, remote reseat program 112 provides the capability to perform one or more reseat actions based, at least in part, on a pass/fail status of the prerequisite check. In one embodiment, remote reseat program 112 provides the capability to schedule an operation push file to prescribe recovery operations to a client, where the prescribed recovery operations include information necessary to perform a part reseat operation.

In one embodiment, remote reseat program 112 may be configured to access various data sources, such as a database or repository (not shown), that may include personal data, content, contextual data, or information a user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Remote reseat program 112 enables the authorized and secure processing of personal data. In one embodiment, remote reseat program 112 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In another embodiment, remote reseat program 112 provides information regarding personal data and the nature (e.g., type, scope, purpose, duration, etc.) of the processing. In one embodiment, remote reseat program 112 provides a user with copies of stored personal data. In one embodiment, remote reseat program 112 allows the correction or completion of incorrect or incomplete personal data. In one embodiment, remote reseat program 112 allows the immediate deletion of personal data.

In one embodiment, client device 106, client device 108, and client device 110 are clients to server 104 and may be, for example, a desktop computer, a laptop computer, a tablet computer, a personal digital assistant (PDA), a smart phone, a thin client, or any other electronic device or computing system capable of communicating with server 104 through network 102. For example, client device 106 may be a client device, such as a smart phone, capable of connecting to a network, such as network 102, to access the Internet, utilize one or more IT management tools, and utilize one or more software applications. In another example, client device 108 and client device 110 may be a computing device utilized by an IT service technician, respectively. In one embodiment, client device 106, client device 108, and client device 110 may be any suitable type of client device capable of executing one or more applications utilizing a mobile operating system or a computer operating system. In one embodiment, client device 106, client device 108, and client device 110 may include a user interface (not shown) for providing a user (e.g., a client, an IT service technician, etc.) with the capability to interact with remote reseat program 112 and any associated components (e.g., databases, server computers, software and hardware components, etc.). A user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In one embodiment, client device 106, client device 108, and client device 110 may be any wearable electronic devices, including wearable electronic devices affixed to eyeglasses and sunglasses, helmets, wristwatches, clothing, wigs, tattoos, embedded devices, and the like, capable of sending, receiving, and processing data. In one embodiment, client device 106, client device 108, and client device 110 may be any wearable computer capable of operating a computer program, such as remote reseat program 112, for performing remote part reseat operations. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client device 106, client device 108, and client device 110 each represent one or more programmable electronic devices or combination of programmable electronic devices capable of executing machine readable program instructions and communicating with other computing devices (not shown) within data processing environment 100 via a network, such as network 102. In an alternative embodiment, client device 106, client device 108, and client device 110 may be remotely managed industrial equipment.

Figure 2:
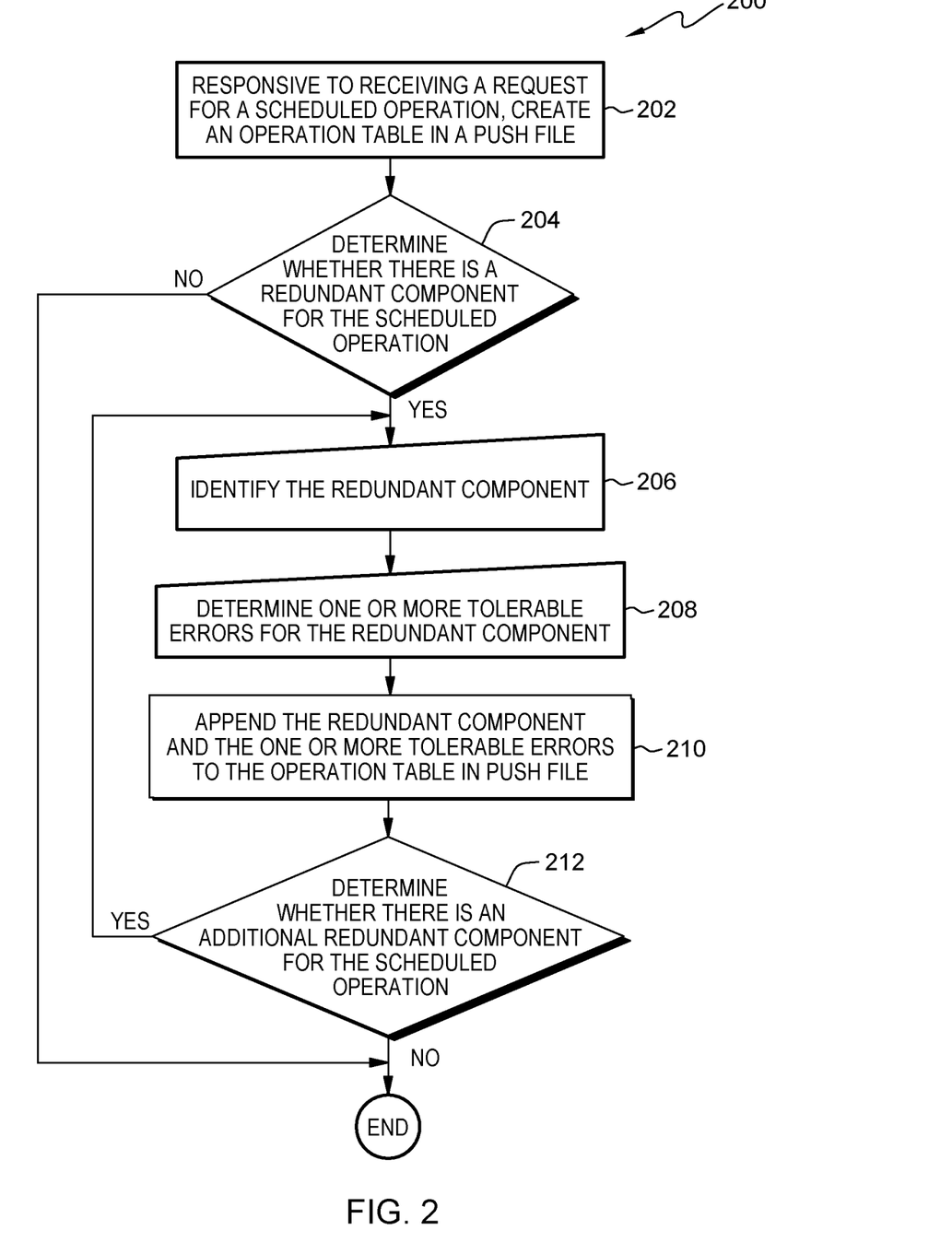
FIG. 2 is a flowchart depicting operational steps of a remote reseat program, such as the remote reseat program of FIG. 1, generally designated 200, performing support push file generation procedures, in accordance with an embodiment of the present invention.

FIG. 2 is a flowchart depicting operational steps of a remote reseat program, such as remote reseat program 112, generally designated 200, for performing support push file generation procedures, in accordance with an embodiment of the present invention.

Responsive to receiving a request for a scheduled operation, remote reseat program 112 creates an operation table in a push file (202). In one embodiment, remote reseat program 112 generates an operation table in a push file by prompting for service file general data. In one embodiment, service file general data may include system identification data, such as model, serial number, and unique identification, that allows a push file to be routed to a target machine or system. In one embodiment, the operation table in the push file may be automatically populated with machine information. In another embodiment, service file general data may include a timestamp of the push file for record purposes, a creator name and contact information, which may be automatically populated in the operation table in the push file based on user account information, data to be collected before all remote operations contained in the push file, such as specified data transmission executables or specific collected logs, and data to be collected after all remote operations contained in the push file, such as specified data transmission executables or specific collected logs. In one embodiment, remote reseat program 112 prompts for at least one service file requested remote operation to be performed, where prompting includes gathering a type of operation to be performed on a specified component, a specified time frame for allowing remote support operations to take place, such as a specified time frame that considers whether a support representative needs to be available during operations, data reviews, a start date and an end date, and scheduling availability after the request for operations is received, and one or more associated problem identifiers, if any. In one embodiment, where there are more than one service file requesting remote operations, remote reseat program 112 may specify a designated order by which the operations are to be successfully completed. In one embodiment, the push file includes a type of operation on a component, and specifies a plurality of unique recovery parameters, wherein the plurality of unique recovery parameters include data types to be collected before and after the reseat action and redundant component information.

Remote reseat program 112 determines whether there is a redundant component for the scheduled operation (decision block 204). In one embodiment, the redundant component information includes redundant parts for the remote reseat operation and tolerable errors that may be experienced by the redundant parts.

Responsive to a determination that there is no redundant component for the scheduled operation (NO branch, 204), remote reseat program 112 ends performance of support push file generation procedures. Responsive to a determination that there is a redundant component for the scheduled operation, remote reseat program 112 identifies the redundant component (206).

Remote reseat program 112 determines one or more tolerable errors for the redundant component (208). In one embodiment, examples of tolerable errors for the redundant component may include reference codes, log entries, error codes, and specific error codes against a specific component.

Remote reseat program 112 appends the redundant component and the one or more tolerable errors to the operation table in the push file (210).

Remote reseat program 112 determines whether there is an additional component for the scheduled operation (decision block 212). Responsive to a determination that there is no additional component for the scheduled operation (NO branch, 212), remote reseat program 112 ends performance of support push file generation procedures.

Responsive to a determination that there is an additional component for the scheduled operation (YES branch, 212), remote reseat program 112 proceeds to identify the additional redundant component and perform subsequent steps (206 and 208-212). In one embodiment, remote reseat program 112 may determine additional operations contained within the push file that the requested operation depends on, such as additional operations that should be scheduled before the requested operation is performed, and additional operations that do not fail a prerequisite check, as discussed below in greater detail in subsequent Figures.

In one embodiment, remote reseat program 112 schedules an operation push file to prescribe one or more recovery operations, wherein the one or more recovery operations include information necessary to perform the operations. In some embodiments, scheduled remote reseat operations may vary based on client parameters. For example, an aggressive approach to scheduling remote reseat operations may include allowing a remote support service to schedule a remote reseat operation when needed for debugging and redundancy is confirmed. In this example, remote reseat program 112 may utilize a push file to confirm and prescribe reseat actions, where the push file also contains information about when the reseat actions are to be performed and a plurality of time windows including information consisting of an earliest starting date/time when an operation could start and the last possible date/time (in local time) that an operation could start.

In another example, a moderate approach to scheduling remote reseat operations may include requiring a client to sign off on the scheduling of any remote reseat operations. In this example, remote reseat program 112 may provide the capability for a client to create scheduled operations and set limitations for what parts can or cannot be remotely reseated. In this example, the scheduled operation would consist of one or more time windows when the client would allow the remote reseat operation to be performed, where each of the one or more time windows specified contain an earliest starting date and time for when an operation could start, a latest starting date and time for when an operation could start, a date/times specified in the reseat operation that could be for one time zone (such as GMT or a time zone of the client), but can ultimately be mapped to a different time zone, an identifier (e.g. user ID) of the client scheduling the operation to develop an audit trail of who authorized the reseat operation and provide contact information, and various other information useful for conducting remote reseat operations.

In yet another example, a conservative approach to scheduling remote reseat operations may require scheduling be done at a time agreed upon by both a client and a support representative. In this example, remote reseat program 112 may provide a client with the capability to schedule reseat operations based on one or more time windows when a client and a support representative agree to perform the remote reseat operation, where each of the one or more time windows specified contain an earliest starting date and time for when an operation could start, a latest starting date and time for when an operation could start, a date/times specified in the reseat operation that could be for one time zone (such as GMT or a time zone of the client), but can ultimately be mapped to a time zone of the support representative, an identifier (e.g. user ID) of the client scheduling the operation to develop an audit trail of who authorized the reseat operation and provide contact information, and various other information useful for conducting remote reseat operations.

Figure 3A:
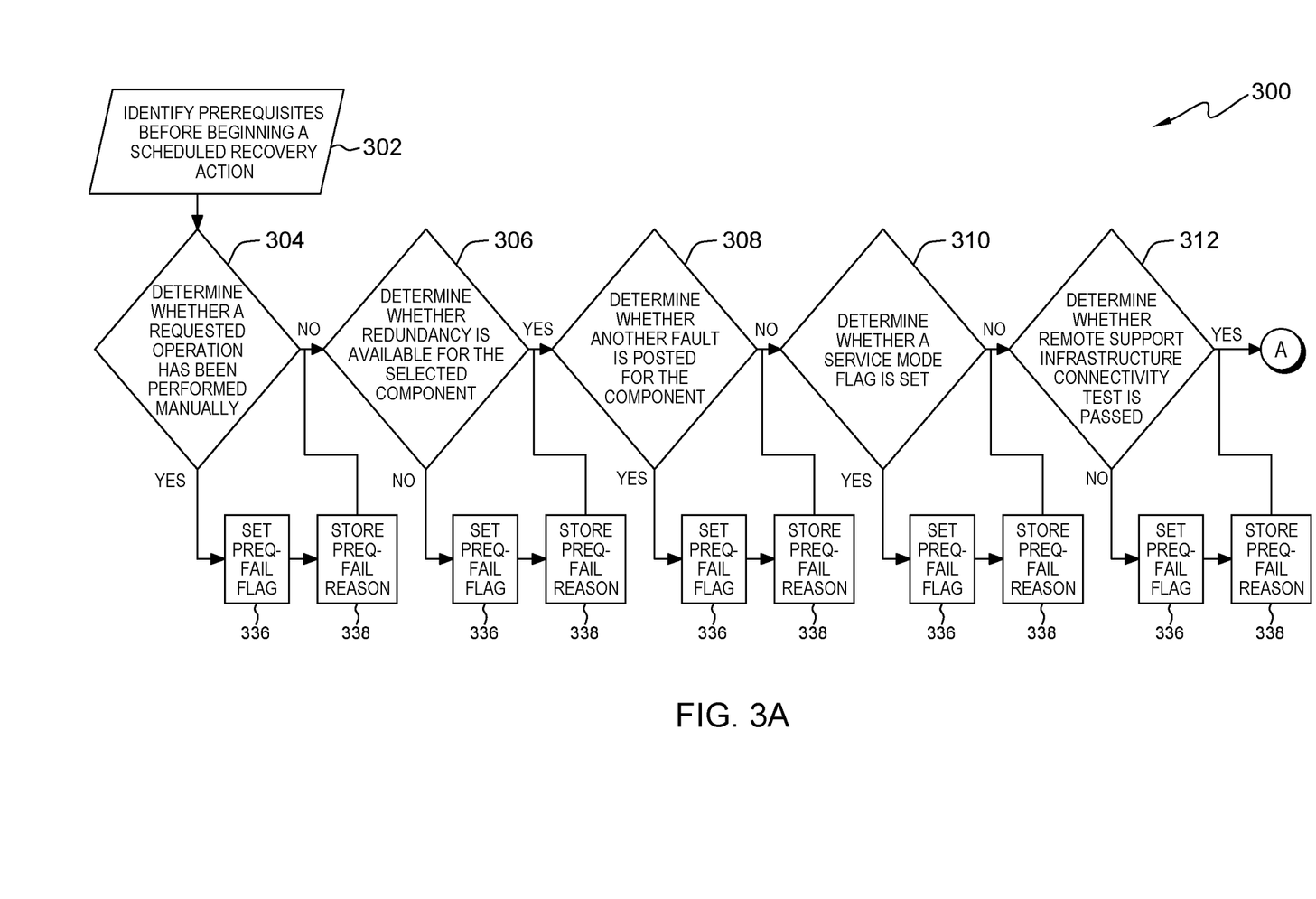
FIG. 3A is a flowchart depicting operational steps of a remote reseat program, such as the remote reseat program of FIG. 1, generally designated 300, performing prerequisite check procedures, in accordance with an embodiment of the present invention.

FIG. 3A is a flowchart depicting operational steps of a remote reseat program, such as remote reseat program 112, generally designated 300, performing prerequisite check procedures, in accordance with an embodiment of the present invention.

Remote reseat program 112 identifies prerequisites before beginning a scheduled recovery action (302). In one embodiment, remote reseat program 112 identifies a plurality of prerequisites by performing a prerequisite check before the reseat operation is performed and checks actions to be performed based on a pass/fail status of the prerequisite check.

Remote reseat program 112 determines whether a requested operation has been performed manually (decision block 304). In one embodiment, remote reseat program 112 determines whether a requested operation has been performed manually by checking service logs to determine if any local repair operations have been performed on selected components after the recovery action was scheduled by the remote support server. In one embodiment, remote reseat program 112 determines whether an exact match for the specified operations have been performed locally and has an alternate service operation been performed on the selected component after the operation was scheduled. Where an exact match for the specified operations have been performed locally or an alternate service operation has been performed on the selected component since the operation was scheduled, remote reseat program 112 determines that the requested operation was been performed manually. Responsive to a determination that a requested operation has been performed manually (YES branch, 304), remote reseat program 112 sets a prequalification fail flag (336) and stores a prequalification fail reason (338).

Responsive to a determination that the requested operation has not been performed manually (NO branch, 304), remote reseat program 112 determines whether redundancy is available for the selected component (decision block 306). In one embodiment, remote reseat program 112 determines whether redundancy is available for the selected component by determining whether redundancy is relevant, such as a non-redundant component not operating, and therefore no additional impact is expected. In one embodiment, redundancy can be confirmed as relevant where a support representative requesting the scheduled operation specifies any confirmed critical redundant parts on a domain. In one embodiment, remote reseat program 112 determines whether a support representative requesting the reseat operation specified any expected tolerable approved errors that may be posted against a targeted part or critical component prior to the reseat operation. Where a support representative does not confirm a critical redundant component on the domain, remote reseat program 112 determines redundancy is not available for the selected component (e.g., redundancy is not required). Responsive to a determination that redundancy is not available (e.g., redundancy is required, but cannot be verified) for the component (NO branch, 306), remote reseat program 112 sets a prequalification fail flag (336) and stores a prequalification fail reason (338).

Responsive to a determination that redundancy is available for the selected component (YES branch, 306), remote reseat program 112 determines whether another fault is posted for the component (decision block 308). In one embodiment, remote reseat program 112 determines whether another fault is posted for the component by confirming a timestamp for when the scheduled recovery action was transmitted by the remote support server by referencing the timestamp in a schedule operation database. In one embodiment, remote reseat program 112 scans for errors posted for the selected component occurring after the scheduled recovery operation request was transmitted from the remote support server. In another embodiment, remote reseat program 112 scans for errors posted against a critical component specified by the remote support request occurring after the scheduled recovery operation request was transmitted from the remote support server. Responsive to a determination that a fault is posted for the component (YES branch, 308), remote reseat program 112 sets a prequalification fail flag (336) and stores a prequalification fail reason (338).

Responsive to a determination that no fault is posted for the component (NO branch, 308), remote reseat program 112 determines whether a servicing mode flag is set (decision block 310). In one embodiment, remote reseat program 112 determines whether a servicing mode flag is set by checking for an approval flag on an error problem record to continue the scheduled operation (e.g., check against database of known approved/tolerable errors). In one embodiment, remote reseat program 112 checks a service flag to confirm it is not set due to other on-going concurrent service operations. Responsive to a determination that a servicing mode flag is set (YES branch, 310), remote reseat program 112 sets a prequalification fail flag (336) and stores a prequalification fail reason (338).

Responsive to a determination that a servicing mode flag is not set (NO branch, 310), remote reseat program 112 determines whether a remote support infrastructure connectivity test is passed (decision block 312). In one embodiment, remote reseat program 112 determines whether a remote support infrastructure test is passed by determining an active connection to one or more remote support servers is confirmed by the service and support processor. In one embodiment, remote reseat program 112 confirms an active connection to one or more remote support servers by attempting to send an operation prerequisite check start log to a remote support server, where the start log may include system details, client details, a problem ticket number/identifier for a relevant operation, and a scheduled operation number. In one embodiment, remote reseat program 112 waits a specified period of time for a confirmation log to be received and checks any response for a cancelation request. In one embodiment, remote reseat program 112 may store logs of confirmations for the service and support processor as well as the remote support server. Where connectivity cannot be confirmed or a cancelation request is returned, remote reseat program 112 determines that the remote support infrastructure connectivity test does not pass.

Responsive to a determination that the remote support infrastructure connectivity test is passed (YES branch, 312), remote reseat program 112 proceeds to subsequent steps (beginning at decision block 314) that are described in further detail below in FIG. 3B.

Responsive to a determination that the remote support infrastructure connectivity test is not passed (NO branch, 312), remote reseat program 112 sets a prequalification fail flag (336) and stores a prequalification fail reason (338).

Figure 3B:
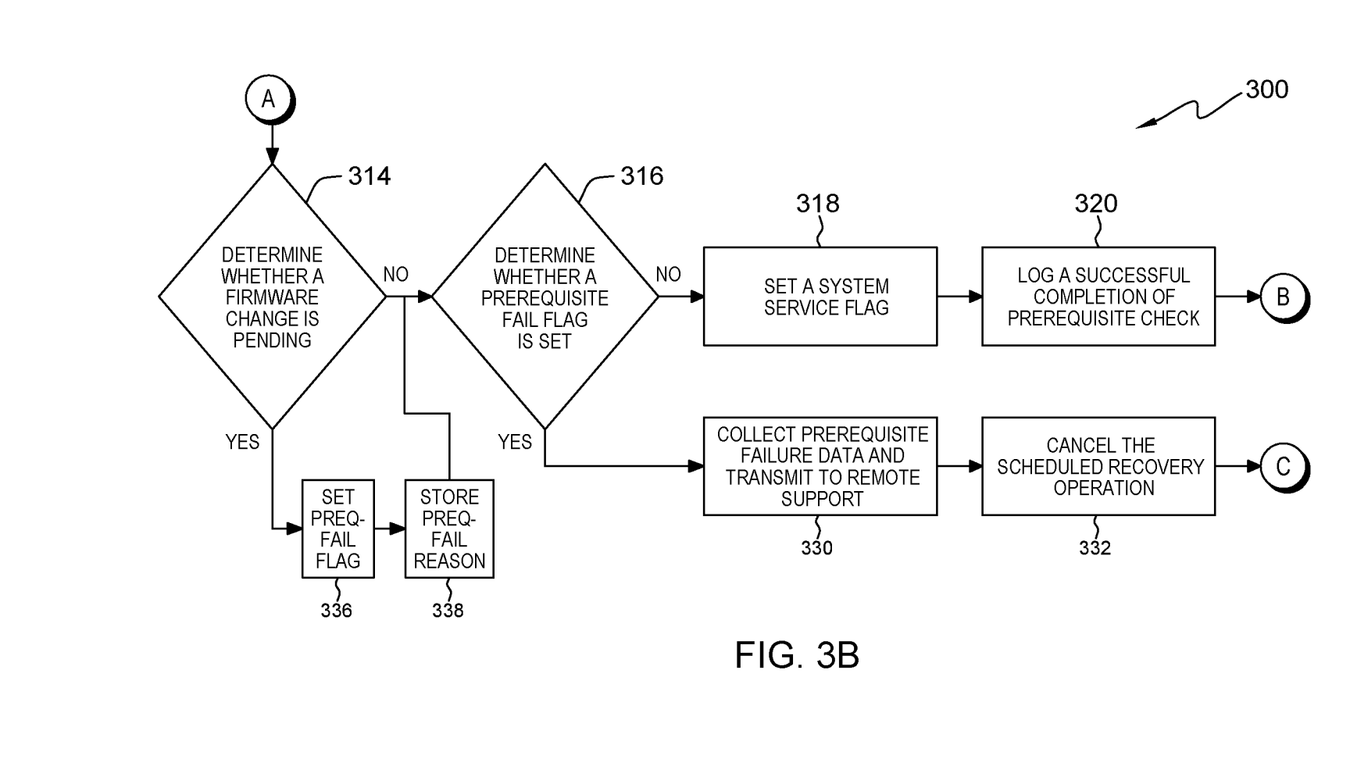
FIG. 3B is a flowchart depicting operational steps of a remote reseat program, such as the remote reseat program of FIG. 1, generally designated 300, performing prerequisite check procedures, in accordance with an embodiment of the present invention.

FIG. 3B is a flowchart depicting operational steps of a remote reseat program, such as remote reseat program 112, generally designated 300, performing prerequisite check procedures, in accordance with an embodiment of the present invention.

Remote reseat program 112 determines whether a firmware change is pending (decision block 314). Responsive to a determination that a firmware change is pending (YES branch, 314), remote reseat program 112 sets a prequalification fail flag (336) and stores a prequalification fail reason (338).

Responsive to a determination that a firmware change is not pending (NO branch, 314), remote reseat program 112 determines whether a prerequisite fail flag is set (decision block 316). Responsive to a determination that a prerequisite fail flag is set (YES branch, 316), remote reseat program 112 collects prerequisite failure data and transmits the failure data to remote support (330).

Responsive to transmitting the failure data to remote support (330), remote reseat program 112 cancels the scheduled recovery operation (332) and proceeds to a subsequent step (334) that is described in further detail below in FIG. 3C.

Responsive to a determination that a prerequisite fail flag is not set (NO branch, 316), remote reseat program 112 sets a system service flag (318).

Responsive to setting the system service flag (318), remote reseat program 112 logs a successful completion of the prerequisite check (320) and proceeds to subsequent steps (beginning at 322) that are described in further detail below in FIG. 3C.

Figure 3C:
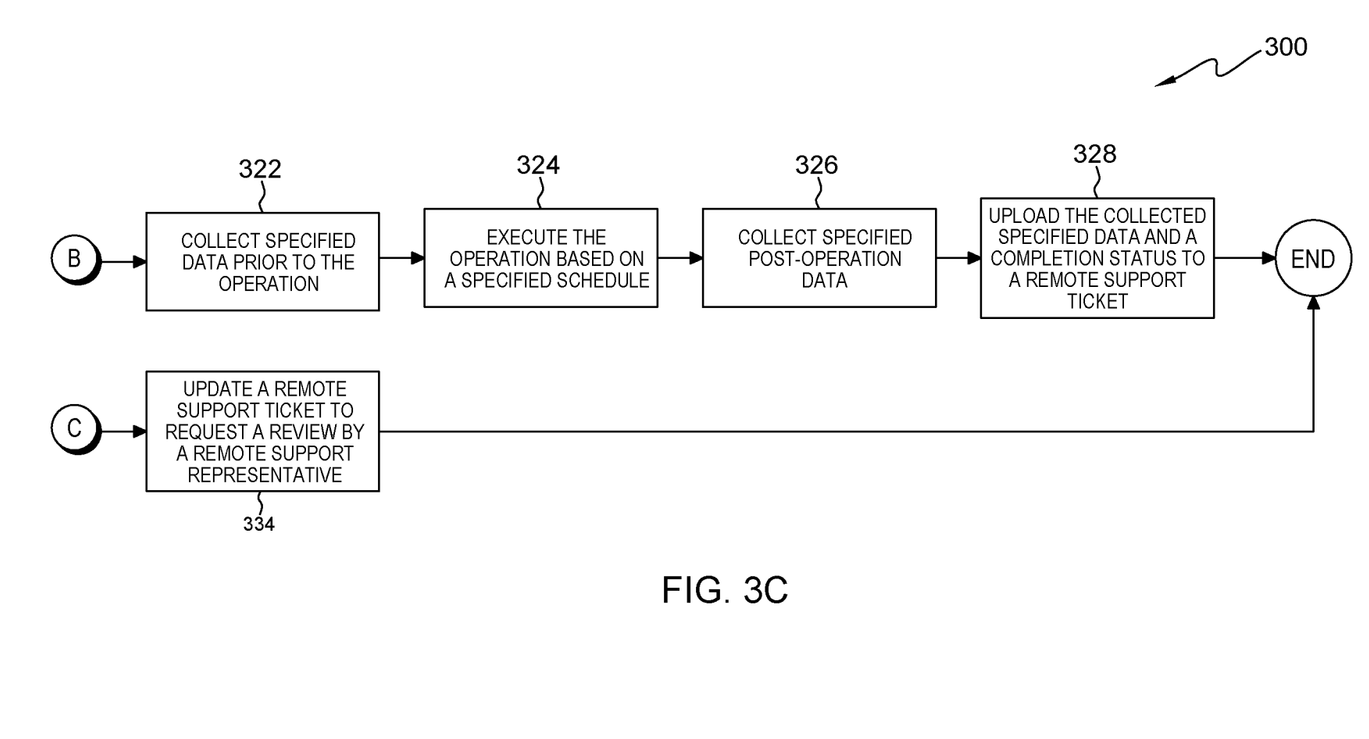
FIG. 3C is a flowchart depicting operational steps of a remote reseat program, such as the remote reseat program of FIG. 1, generally designated 300, performing prerequisite check procedures, in accordance with an embodiment of the present invention.

FIG. 3C is a flowchart depicting operational steps of a remote reseat program, such as remote reseat program 112, generally designated 300, performing prerequisite check procedures, in accordance with an embodiment of the present invention.

Responsive to logging a successful completion of the prerequisite check (320), remote reseat program 112 collects specified data prior to the operation (322). Remote reseat program 112 executes the operation based on a specified schedule (324). Remote reseat program 112 collects specified post-operation data (326). Remote reseat program 112 uploads the collected specified data and a completion status to a remote support ticket (328) and ends performance of the prerequisite check procedures.

Responsive to canceling the scheduled recovery operation (332), remote reseat program 112 updates a remote support ticket to request a review by a remote support representative (334) and ends performance of the prerequisite check procedures.

Figure 4:
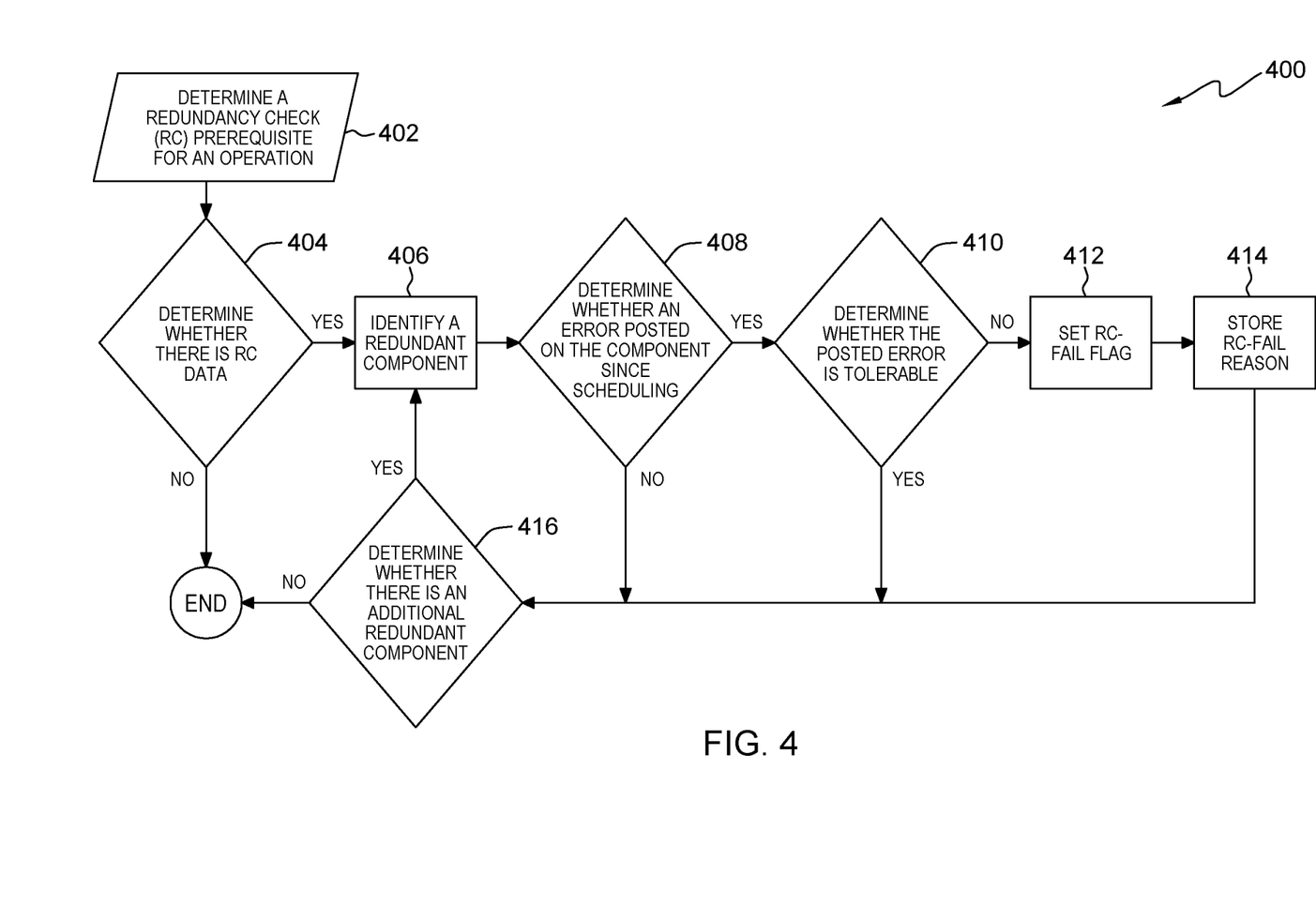
FIG. 4 is a flowchart depicting operational steps of a remote reseat program, such as the remote reseat program of FIG. 1, generally designated 400, performing redundancy check procedures, in accordance with an embodiment of the present invention.

FIG. 4 is a flowchart depicting operational steps of a remote reseat program, such as remote reseat program 112, generally designated 400, performing redundancy check procedures, in accordance with an embodiment of the present invention.

Remote reseat program 112 determines a redundancy check (RC) prerequisite for an operation (402).

Remote reseat program 112 determines whether there is RC data (decision block 404). Responsive to a determination that there is no RC data (NO branch, 404), remote reseat program 112 ends performance of redundancy check procedures.

Responsive to a determination that there is RC data (YES branch, 404), remote reseat program 112 identifies a redundant component (406).

Remote reseat program 112 determines whether an error posted on the redundant component since scheduling (decision block 408). Responsive to a determination that an error has not posted on the redundant component since scheduling (NO branch, 408), remote reseat program 112 determines whether there is an additional redundant component (decision block 416).

Responsive to a determination that an error has posted on the redundant component since scheduling (YES branch, 408), remote reseat program 112 determines whether the posted error is tolerable (decision block 410). Responsive to a determination that the posted error is not tolerable (NO branch, 410), remote reseat program 112 sets a RC-fail flag (412) and stores a RC-fail reason (414).

Responsive to a determination that the posted error is tolerable (YES branch, 410), remote reseat program 112 determines whether there is an additional redundant component (decision block 416). Responsive to a determination that there is an additional redundant component (YES branch, 416), remote reseat program 112 identifies the additional redundant component (406) and proceeds through previous steps (408-416). Responsive to a determination that there is not an additional redundant component (NO branch, 416), remote reseat program 112 ends performance of redundancy check procedures.

Figure 5:
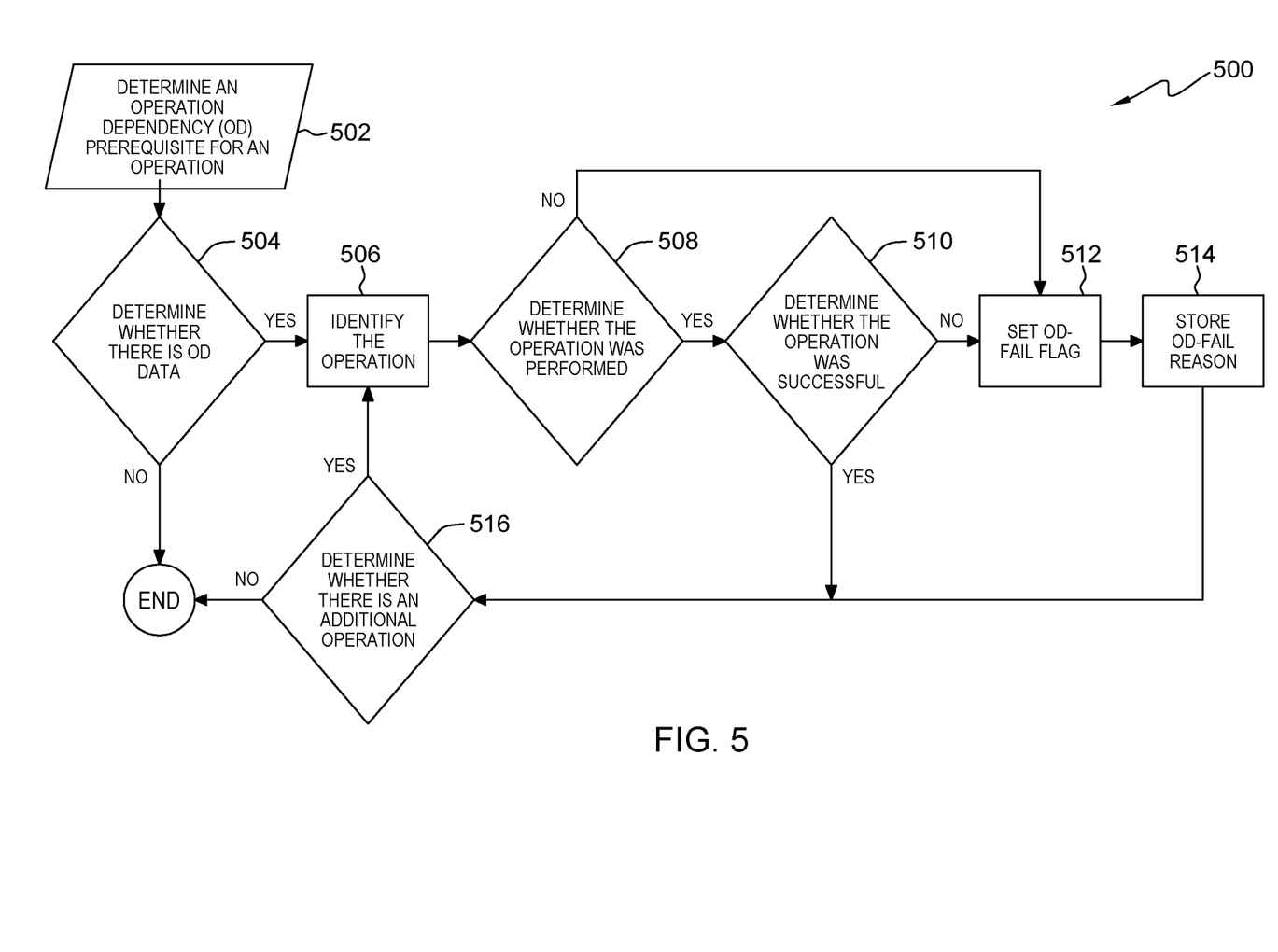
FIG. 5 is a flowchart depicting operational steps of a remote reseat program, such as the remote reseat program of FIG. 1, generally designated 500, performing operation dependency check procedures, in accordance with an embodiment of the present invention.

FIG. 5 is a flowchart depicting operational steps of a remote reseat program, such as remote reseat program 112, generally designated 500, performing operation dependency check procedures, in accordance with an embodiment of the present invention.

Remote reseat program 112 determines an operation dependency (OD) prerequisite for an operation (502). In one embodiment, where the push file contains more than one operation, remote reseat program 112 determines the OD prerequisites for each of the operations.

Remote reseat program 112 determines whether there is OD data (decision block 504). Responsive to a determination that there is no OD data (NO branch, 504), remote reseat program 112 ends performance of remote part reseat actions.

Responsive to a determination that there is OD data (YES branch, 504), remote reseat program 112 identifies the operation (506).

Remote reseat program 112 determines whether the operation was performed (decision block 508). Responsive to a determination that the operation was not performed (NO branch, 508), remote reseat program 112 sets an OD-fail flag (512) and stores an OD-fail reason (514).

Responsive to a determination that the operation was performed (YES branch, 508), remote reseat program 112 determines whether the operation was successful (decision block 510). Responsive to a determination that the operation was not successful (NO branch, 510), remote reseat program 112 sets an OD-fail flag (512) and stores an OD-fail reason (514).

Responsive to a determination that the operation was successful (YES branch, 510), remote reseat program 112 determines whether there is an additional operation (decision block 516). Responsive to a determination that there is an additional redundant component (YES branch, 416), remote reseat program 112 identifies the additional operation (506) and proceeds through previous steps (508-516). Responsive to a determination that there is not an additional operation (NO branch, 516), remote reseat program 112 ends performance of remote part reseat actions.

Figure 6:
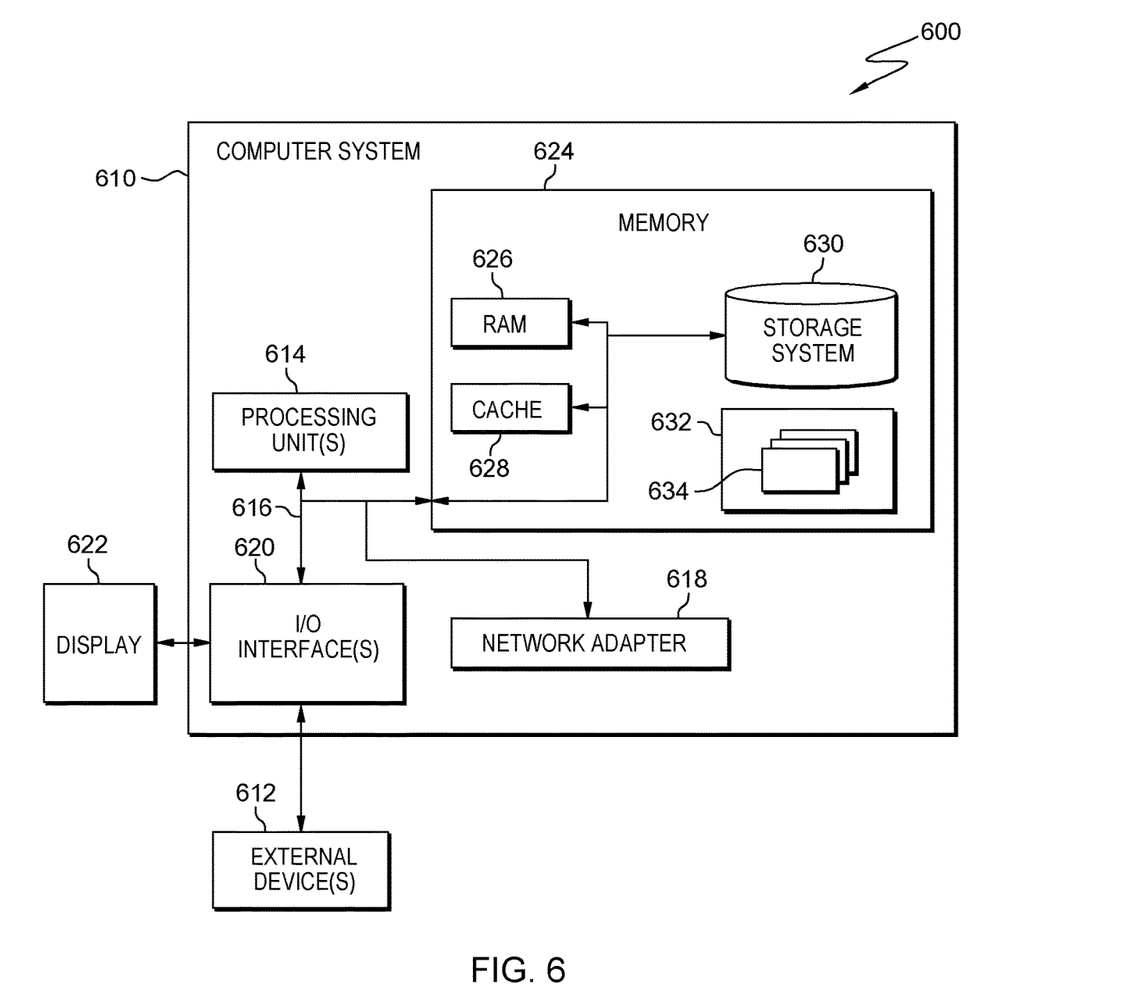
FIG. 6 is a block diagram depicting components of a data processing environment, such as the server of FIG. 1, generally designated 600, in accordance with an embodiment of the present invention.

FIG. 6 is a block diagram depicting components of a data processing environment, such as server 104 of data processing environment 100, generally designated 600, in accordance with an embodiment of the present invention. It should be appreciated that FIG. 6 provides only an illustration of one implementation and does not imply any limitations with regard to the environments in that different embodiments may be implemented. Many modifications to the depicted environment may be made.

In the illustrative embodiment, server 104 in data processing environment 100 is shown in the form of a general-purpose computing device, such as computer system 610. The components of computer system 610 may include, but are not limited to, one or more processors or processing unit(s) 614, memory 624 and bus 616 that couples various system components including memory 624 to processing unit(s) 614.

Bus 616 represents one or more of any of several types of bus structures, including a memory bus or memory controller, a peripheral bus, an accelerated graphics port and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus.

Computer system 610 typically includes a variety of computer system readable media. Such media may be any available media that is accessible by computer system 610 and it includes both volatile and non-volatile media, removable and non-removable media.

Memory 624 can include computer system readable media in the form of volatile memory, such as random access memory (RAM) 626 and/or cache memory 628. Computer system 610 may further include other removable/non-removable, volatile/non-volatile computer system storage media. By way of example only, storage system 630 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk, such as a CD-ROM, DVD-ROM or other optical media can be provided. In such instances, each can be connected to bus 616 by one or more data media interfaces. As will be further depicted and described below, memory 624 may include at least one computer program product having a set (e.g., at least one) of program modules that are configured to carry out the functions of embodiments of the invention.

Program/utility 632, having one or more sets of program modules 634, may be stored in memory 624 by way of example and not limitation, as well as an operating system, one or more application programs, other program modules and program data. Each of the operating systems, one or more application programs, other program modules and program data or some combination thereof, may include an implementation of a networking environment. Program modules 634 generally carry out the functions and/or methodologies of embodiments of the invention as described herein. Computer system 610 may also communicate with one or more external device(s) 612, such as a keyboard, a pointing device, a display 622, etc. or one or more devices that enable a user to interact with computer system 610 and any devices (e.g., network card, modem, etc.) that enable computer system 610 to communicate with one or more other computing devices. Such communication can occur via Input/Output (I/O) interface(s) 620. Still yet, computer system 610 can communicate with one or more networks, such as a local area network (LAN), a general wide area network (WAN) and/or a public network (e.g., the Internet) via network adapter 618. As depicted, network adapter 618 communicates with the other components of computer system 610 via bus 616. It should be understood that although not shown, other hardware and software components, such as microcode, device drivers, redundant processing units, external disk drive arrays, RAID systems, tape drives and data archival storage systems may be used in conjunction with computer system 610.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer readable program instructions.

These computer readable program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for performing remote part reseat actions, the method comprising:
    performing, by one or more computer processors, a prerequisite check for a scheduled operation on an operation table in a push file;
    before beginning the scheduled operation, identifying, by the one or more computer processors, prerequisites based, at least in part, on the prerequisite check;
    determining, by the one or more computer processors, whether the scheduled operation has been performed manually;
    determining, by the one or more computer processors, whether redundancy is available for a component;
    responsive to a determination that redundancy is available for the component for the scheduled operation, determining, by the one or more computer processors, one or more tolerable errors for the component; and
    appending, by the one or more computer processors, the component and the one or more tolerable errors to the operation table in the push file.

2. The method of claim 1, further comprising:
    determining, by the one or more computer processors, whether a fault is posted for the component;
    determining, by the one or more computer processors, whether a service mode flag is set;
    determining, by the one or more computer processors, whether a remote support infrastructure connectivity test is passed;
    determining, by the one or more computer processors, whether a firmware change is pending; and
    determining, by the one or more computer processors, whether a prerequisite fail flag is set.

3. The method of claim 2, wherein determining whether the remote support infrastructure connectivity test is passed, further comprises:
    collecting, by the one or more computer processors, prerequisite failure data;
    transmitting, by the one or more computer processors, the prerequisite failure data to remote support;
    logging, by the one or more computer processors, a successful completion of the prerequisite check;
    executing, by the one or more computer processors, the scheduled operation;
    collecting, by the one or more computer processors, specified post-operation data; and
    uploading, by the one or more computer processors, the specified post-operation data and a completion status to a remote support ticket.

4. The method of claim 1, further comprising:
    performing, by the one or more computer processors, a redundancy check for the scheduled operation;
    determining, by the one or more computer processors, a redundancy check prerequisite for the scheduled operation; and
    determining, by the one or more computer processors, whether an error has posted on the component since scheduling.

5. The method of claim 4, further comprising:
    determining, by the one or more computer processors, whether the error posted on the component is tolerable; and
    determining, by the one or more computer processors, whether there is an additional redundant component.

6. The method of claim 1, further comprising:
    performing, by the one or more computer processors, an operation dependency check for the scheduled operation;
    determining, by the one or more computer processors, an operation dependency prerequisite for the scheduled operation;
    determining, by the one or more computer processors, whether there is operation dependency data;
    identifying, by the one or more computer processors, an operation; and
    determining, by the one or more computer processors, whether the operation was performed.

7. A computer program product for performing remote part reseat actions, the computer program product comprising:
    one or more computer readable storage media and program instructions stored on the one or more computer readable storage devises media, the stored program instructions comprising:
        program instructions to perform a prerequisite check for a scheduled operation on an operation table in a push file;
        program instructions to, before beginning the scheduled operation, identify prerequisites based, at least in part, on the prerequisite check;
        program instructions to determine whether the scheduled operation has been performed manually;
        program instructions to determine whether redundancy is available for a component;
        program instructions to, responsive to a determination that redundancy is available for the component for the scheduled operation, determine one or more tolerable errors for the component; and
        program instructions to append the component and the one or more tolerable errors to the operation table in the push file.

8. The computer program product of claim 7, the stored program instructions further comprising:
    program instructions to determine whether a fault is posted for the component;
    program instructions to determine whether a service mode flag is set;
    program instructions to determine whether a remote support infrastructure connectivity test is passed;
    program instructions to determine whether a firmware change is pending; and
    program instructions to determine whether a prerequisite fail flag is set.

9. The computer program product of claim 8, wherein the program instructions to determine whether a remote support infrastructure connectivity test is passed further comprise:
    program instructions to collect prerequisite failure data;
    program instructions to transmit the prerequisite failure data to remote support;
    program instructions to log a successful completion of the prerequisite check;

program instructions to execute the scheduled operation;
program instructions to collect specified post-operation data; and
program instructions to upload the specified post-operation data and a completion status to a remote support ticket.

10. The computer program product of claim 7, the stored program instructions further comprising:
program instructions to perform a redundancy check for the scheduled operation;
program instructions to determine a redundancy check prerequisite for the scheduled operation; and
program instructions to determine whether an error has posted on the redundant component since scheduling.

11. The computer program product of claim 10, the stored program instructions further comprising:
program instructions to determine whether the error posted on the component is tolerable; and
program instructions to determine whether there is an additional redundant component.

12. The computer program product of claim 7, the stored program instructions further comprising:
program instructions to perform an operation dependency check for the scheduled operation;
program instructions to determine an operation dependency prerequisite for the scheduled operation;
program instructions to determine whether there is operation dependency data;
program instructions to identify an operation; and
program instructions to determine whether the operation was performed.

13. A computer system for performing remote part reseat actions, the computer system comprising:
one or more computer processors;
one or more computer readable storage media; and
program instructions stored on at least one of the one or more computer readable storage media for execution by at least one of the one or more computer processors, the stored program instructions comprising:
program instructions to perform a prerequisite check for a scheduled operation on an operation table in a push file;
program instructions to, before beginning the scheduled operation, identify prerequisites based, at least in part, on the prerequisite check;
program instructions to determine whether the scheduled operation has been performed manually;
program instructions to determine whether redundancy is available for a component;
program instructions to, responsive to a determination that redundancy is available for the component for the scheduled operation, determine one or more tolerable errors for the component; and
program instructions to append the component and the one or more tolerable errors to the operation table in the push file.

14. The computer system of claim 13, the stored program instructions further comprising:
program instructions to determine whether a fault is posted for the component;
program instructions to determine whether a service mode flag is set;
program instructions to determine whether a remote support infrastructure connectivity test is passed;
program instructions to determine whether a firmware change is pending; and
program instructions to determine whether a prerequisite fail flag is set.

15. The computer system of claim 14, wherein the program instructions to determine whether a remote support infrastructure connectivity test is passed further comprise:
program instructions to collect prerequisite failure data;
program instructions to transmit the prerequisite failure data to remote support;
program instructions to log a successful completion of the prerequisite check;
program instructions to execute the scheduled operation;
program instructions to collect specified post-operation data; and
program instructions to upload the specified post-operation data and a completion status to a remote support ticket.

16. The computer system of claim 13, the stored program instructions further comprising:
program instructions to perform a redundancy check for the scheduled operation;
program instructions to determine a redundancy check prerequisite for the scheduled operation; and
program instructions to determine whether an error posted on the component since scheduling.

17. The computer system of claim 16, the stored program instructions further comprising:
program instructions to determine whether the error posted on the component is tolerable; and
program instructions to determine whether there is an additional redundant component.

* * * * *